United States Patent
Korman et al.

(10) Patent No.: US 6,823,064 B1
(45) Date of Patent: Nov. 23, 2004

(54) ENHANCED TERMINAL BLOCK FOR READILY CONNECTING CUSTOMERS TO ANY OF A PLURALITY OF TELECOMMUNICATIONS SERVICE PROVIDERS

(75) Inventors: John J. Korman, Stony Brook, NY (US); Russell J. Smith, Bethpage, NY (US)

(73) Assignee: Verizon Services Corp., Arlington, VA (US)

(*) Notice: Subject to any disclaimer, the term of this patent is extended or adjusted under 35 U.S.C. 154(b) by 0 days.

(21) Appl. No.: 09/364,205

(22) Filed: Jul. 30, 1999

Related U.S. Application Data

(63) Continuation-in-part of application No. 09/263,311, filed on Mar. 8, 1999.

(51) Int. Cl.[7] .............................. H04M 3/00; H04M 7/00
(52) U.S. Cl. ........................ 379/333; 379/334; 379/336
(58) Field of Search ..................... 379/399.01, 207.02, 379/219, 220.01, 221.02, 317, 333–337

(56) References Cited

U.S. PATENT DOCUMENTS

| | | |
|---|---|---|
| 4,734,061 A | 3/1988 | Randall, Jr. et al. |
| 4,979,209 A | 12/1990 | Collins et al. |
| 5,297,199 A | 3/1994 | Graham et al. |
| 5,732,078 A | 3/1998 | Arango |
| 5,832,078 A | 11/1998 | Tuvy et al. |
| 5,903,643 A | 5/1999 | Bruhnke |
| 6,028,928 A | 2/2000 | Mullaney et al. |
| 6,078,661 A * | 6/2000 | Arnett et al. |
| 6,160,880 A * | 12/2000 | Allen |
| 6,246,749 B1 | 6/2001 | Garver et al. |
| 6,307,933 B1 | 10/2001 | Stehlin et al. |
| 6,477,248 B1 | 11/2002 | Bruhnke et al. |

* cited by examiner

*Primary Examiner*—Duc Nguyen
(74) *Attorney, Agent, or Firm*—Leonard C. Suchyta, Esq.; Joel Wall, Esq.; Rader Fishman & Grauer

(57) ABSTRACT

An improved terminal block includes a first connection mechanism which, when enabled, connects a customer to a first service provider, a second connection mechanism which, when enabled, connects the customer to a second service provider, and an enabling mechanism for enabling either the first connection mechanism or the second connection mechanism.

25 Claims, 2 Drawing Sheets

ENHANCED TERMINAL BLOCK FOR READILY CONNECTING CUSTOMERS TO ANY OF A PLURALITY OF TELECOMMUNICATIONS SERVICE PROVIDERS

This is a Continuation-In-Part of patent application Ser. No. 09/263,311, filed on Mar. 8, 1999 and entitled, "Improved Terminal Block for Readily Connecting Customers to Any of a Plurality of Telecommunications Service Providers".

FIELD OF THE INVENTION

The present invention relates generally to communications equipment and, more specifically, to hardware for providing wired communications connections between customers and service providers.

BACKGROUND OF THE INVENTION

Presently-existing telecommunications infrastructure has been inherited from an era where customers were not offered a choice of landline service providers. Each geographic region of the United States was served by a corresponding service provider commonly referred to as a Regional Bell Operating Company, or RBOC. Accordingly, telecommunications interconnection hardware was originally designed with the assumption that all landline customers in a given geographic area would be served by the same telecommunications service provider.

More recently, the Federal Communications Commission has opened up the wired telecommunication services marketplace to free competition. This policy shift was not without its practical ramifications, the most significant of which relates to the adaptability of presently-existing interconnection hardware for use in environments where customers are offered a selection of two or more service providers. Although existing hardware may perform adequately in the operational environment of a single landline service provider, it is oftentimes woefully inadequate to meet the needs of multiple service providers. Another factor serving to further complicate interconnections between customers and multiple service providers is the current proliferation of ancillary customer premises equipment. This equipment permits the tip/ring wire pair entering the customer premises to be utilized for implementing one or more ancillary functions in addition to providing access to the public switched telephone network (PSTN) via a service provider. These ancillary functions are provided via a local service loop, and the ancillary equipment may therefore be equipped with a switching mechanism for selecting either the local loop or the PSTN loop. The local loop may be utilized for a doorbell answering system, a mass announcement system, an emergency notification system, a fire alarm notification system, a security system, or for various other purposes. Since the ancillary equipment must be placed in series (or, less commonly, in parallel) with the tip/ring lines running to the customer premises, the use of such ancillary equipment necessitates additional interconnections.

Refer to FIG. 1, which is an electrical schematic diagram showing the manner in which customers may be connected to single service providers and ancillary equipment using prior art devices and techniques. Terminal block 100 includes a set of respective first terminals 102, 104, 106, 108, each of which is connected to a corresponding second terminal 118, 120, 122, 124, through a corresponding normally-closed contact 134, 136, 138, 140. During normal operation, contacts 134, 146, 138, and 140 remain closed. However, for testing and diagnostic purposes, one or more of these contacts may be temporarily opened, for example, by introducing an insulating plug between the electrical conductors of a contact. These insulating plugs do not remain in the contacts, and are removed after testing is completed.

A service provider provides incoming telephone lines in the form of tip/ring wire pairs. A tip wire 130 of a first phone line from the service provider is connected to terminal 102 of terminal block 100, and a ring wire 132 of this first phone line is connected to terminal 104. Terminal 102 is connected to terminal 118 through a normally closed contact 134. Terminal 118 is connected to a tip wire 138 which is routed to an input port of ancillary equipment such as a doorbell answering system 170. Terminal 104 is connected to terminal 120 through a normally closed contact 136. Terminal 120 is connected to a ring wire 140 which is routed to the input port of doorbell answering system 170. A tip wire 142 and a ring wire 144 are connected to an output port of the doorbell answering system 170.

Tip wire 142 is connected to terminal 122 of terminal block 100, and ring wire 144 is connected to terminal 124 of terminal block 100. Terminal 122 is connected to terminal 106 via a normally-closed contact 138, and terminal 124 is connected to terminal 108 via a normally-closed contact. Terminal 106 is connected to a tip wire 134 routed to a customer premises, and terminal 108 is connected to a ring wire 136 routed to this customer premises.

The doorbell answering system provides a mechanism for selectively coupling tip wire 138 to tip wire 142 and ring wire 140 to ring wire 144 when access from the customer premises to the PSTN is desired. However, when it is desired to furnish a local loop to the customer premises, doorbell answering system 170 disables coupling between tip wire 138 and tip wire 142, and also between ring wire 140 and ring wire 144.

Although the interconnection topology of FIG. 1 is adequate in the operational environment of a single service provider, difficulties arise when such a topology is utilized in an environment of multiple service providers. For example, assume that a given customer uses Ameritech for PSTN access, but resides in an area where PSTN access is also offered by Bell Atlantic. The customer decides that he will discontinues his Ameritech service in favor of Bell Atlantic. To implement this change, tip wire 130 and ring wire 132, connected to an Ameritech switching office, must be physically removed from terminals 102 and 104. New tip and ring wires from a Bell Atlantic switching office must then be attached to terminals 102 and 104.

Physically removing and reconnecting wires to terminal block 100 in order to change service providers is disadvantageous. First of all, most presently available terminal blocks are not designed for repeated wire removals and reconnections. Mechanically, the terminals are designed for applications such that, once a wire is connected, it will usually remain so connected for the entire lifetime of the terminal block. With repeated wire removals and reconnections, some or all of the terminals will experience mechanical degradations over time, resulting in poor contact and imminent failure of the electrical connection. Moreover, as the quality of the connection deteriorates, its resistance to the flow of electrical current increases. This added resistance generates heat and, under some circumstances, may cause a fire. Even if a fire does not occur, repairing a broken or intermittent connection is a very arduous, labor-intensive, and time-consuming process.

Another disadvantage of physically removing and reattaching wires is that it creates the possibility of confusion. Technicians may inadvertently remove a wire from the wrong terminal, inconveniencing a customer who does not expect a disruption of service. Similarly, a technician may inadvertently connect the wrong wire to a terminal, which, depending upon what this wire is actually connected to, may totally deprives the customer of all wired telecommunications service. Moreover, as a practical matter, wiring errors are very time consuming to trace and correct in the field.

With the current and expected proliferation of telecommunication service providers, it is likely that customers will be changing service providers more frequently than in years past. Such changes will cause ever-increasing amounts of terminal block wear-and-tear. Moreover, the opportunities for wiring errors will also increase. What is needed is an improved hardware topology specifically adapted to environments where service providers may be changed on an ongoing basis.

SUMMARY OF THE INVENTION

In view of the foregoing deficiencies of the prior art, it is an object of the invention to provide a hardware mechanism for readily changing a customer's landline telecommunications service provider.

It is a further object of the invention to provide interconnection techniques which do not require the rewiring of terminal blocks in order to change a customer's landline telecommunications service-provider.

It is a still further object of the invention to provide interconnection techniques which do not cause unnecessary wear and tear on terminal blocks due to repeated changes in a customer's choice of service provider.

It is yet a further object of the invention to provide interconnection techniques for use in operational environments where more than one service provider is available, and where the customer is to be provided with a local telephone loop in addition to service provider access. It is a still further object of the invention to provide interconnection techniques which enable technicians to identify wiring errors via a quick visual inspection.

In accordance with the objects of the invention, an improved terminal block is adapted to connect a customer with any one of a plurality of telecommunications service providers, so as to permit the customer's service provider to be changed without inserting or removing wires from the terminal block.

Pursuant to a preferred embodiment of the invention, an improved terminal block includes a first connection mechanism which, when enabled, connects a customer to a first service provider, a second connection mechanism which, when enabled, connects the customer to a second service provider, and an enabling mechanism for enabling the first connection mechanism or the second connection mechanism.

Pursuant to a further embodiment of the invention, a terminal block provides a plurality of first connection mechanisms and a plurality of second connection mechanisms. Each connection mechanism includes a first normally-open contact in series between a first terminal and a second terminal, and a second normally-open contact in series between a third terminal and a fourth terminal. Each respective first connection mechanism is associated with a corresponding second connection mechanism such that the second terminal of a respective first connection mechanism is electrically connected to the first terminal of a corresponding second connection mechanism, and the fourth terminal of a respective first connection mechanism is electrically connected to the third terminal of a corresponding second connection mechanism. Each of respective pairs of first and third terminals of the first connection mechanisms are connected to corresponding incoming twisted-pair telephone lines from a first telecommunications service provider. Each of respective pairs of second and fourth terminals of the second connection mechanisms are connected to corresponding incoming twisted-pair telephone lines from a second telecommunications service provider. Each of respective pairs of second and fourth terminals of first connection mechanisms, and, consequently, each of respective pairs of first and third terminals of second connection mechanisms, are electrically connected to corresponding outgoing twisted-pair telephone lines routed to a customer premises. These telephone lines may be routed directly to the customer premises, or routed to the customer premises through optional ancillary equipment that may place switching devices in series or parallel with these telephone lines. An enabling mechanism is used to provide a conductive path across both normally-open contacts of the first connection mechanism, thereby connecting a customer with the first telecommunications service provider, or to provide a conductive path across both normally-open contacts of the second connection mechanism, thereby connecting the customer with the second telecommunications service provider. The enabling mechanism may include one or more conductive plugs that are insertable between one or more normally-open contacts.

A still further embodiment of the invention is used in the operational environment of optional ancillary equipment. Each of a plurality of first and second connection mechanisms is associated with a corresponding set of third and fourth connection mechanisms. Each third connection mechanism includes a first normally-open contact in series between a first terminal and a second terminal, and a second normally-open contact in series between a third terminal and a fourth terminal. Each fourth connection mechanism also includes a first normally-open contact in series between a first terminal and a second terminal, and a second normally-open contact in series between a third terminal and a fourth terminal. Each respective third connection mechanism is associated with a corresponding fourth connection mechanism such that the second terminal of a respective third connection mechanism is electrically connected to the first terminal of a corresponding fourth connection mechanism, and the fourth terminal of a respective third connection mechanism is electrically connected to the third terminal of a corresponding fourth connection mechanism. Each of respective pairs of first and third terminals of third connection mechanisms are connected to corresponding outgoing twisted-pair telephone lines routed to a customer premises. Each of respective pairs of second and fourth terminals of fourth connection mechanisms are connected to corresponding outgoing twisted-pair telephone lines routed to a customer premises. Each of respective pairs of second and fourth terminals of first connection mechanisms are connected to corresponding input terminals of optional ancillary equipment. Each of respective pairs of second and fourth terminals of third connection mechanisms are connected to corresponding output terminals of this optional ancillary equipment. An enabling mechanism enables the first connection mechanism and the associated third connection mechanism to provide access to the first service provider, or enables the second connection mechanism and the associated fourth connection mechanism to provide access to the first service provider. This enabling mechanism may be provided in the form of removable conductive plugs which are insertable into any of the normally-open contacts such that, upon insertion, electrical continuity between the normally-open contacts is provided.

BRIEF DESCRIPTION OF THE DRAWINGS

The foregoing and other objects and advantages of the present invention will become apparent to those skilled in the art upon reading the following detailed description of the preferred embodiments in conjunction with a review of the appended drawings in which.

DETAILED DESCRIPTION OF THE PREFERRED EMBODIMENTS

Figure 1:
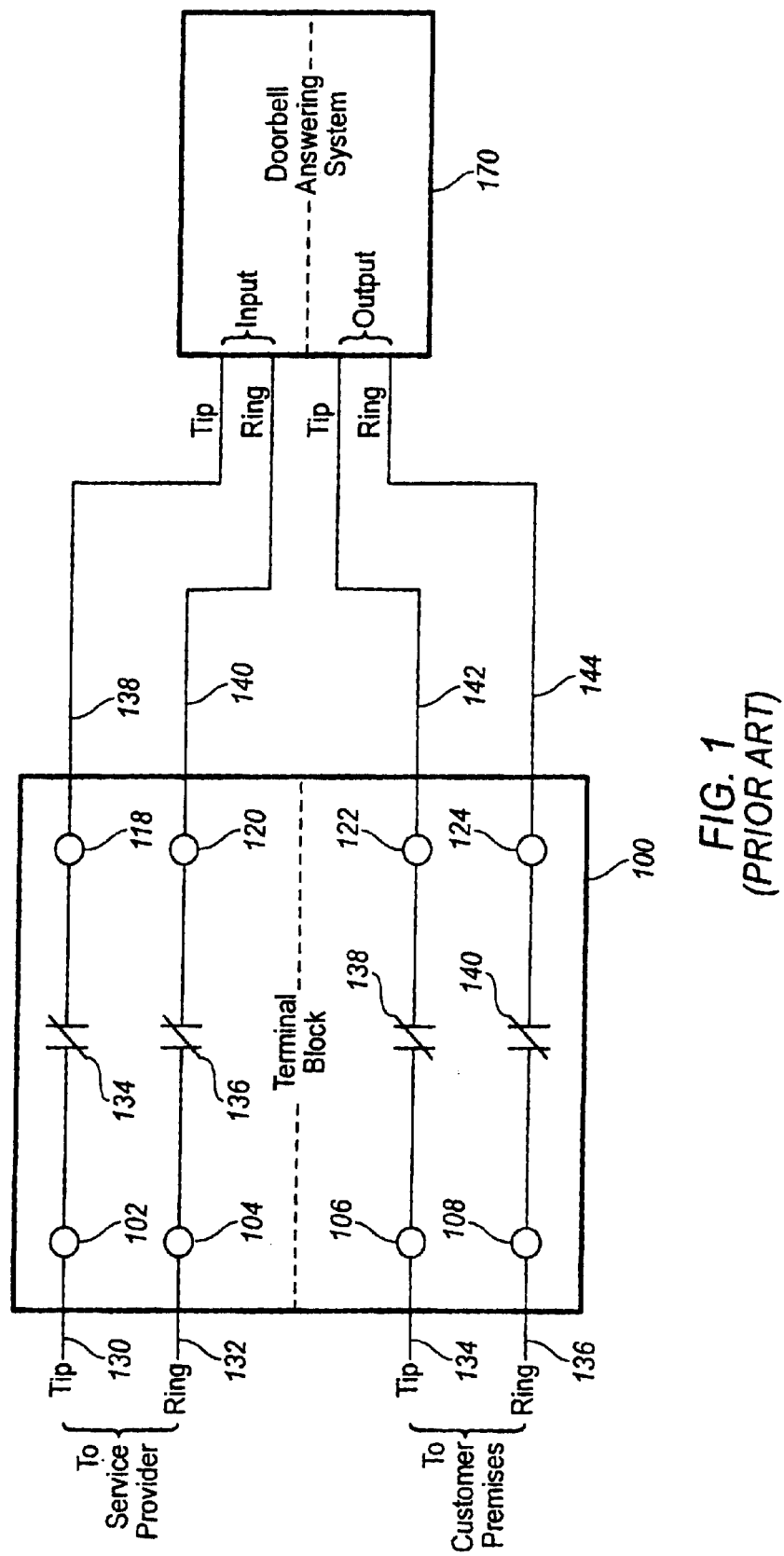
FIG. 1 is an electrical schematic diagram showing the manner in which customers may be connected to any of a plurality of service providers using prior art devices and techniques.
Figure 2:
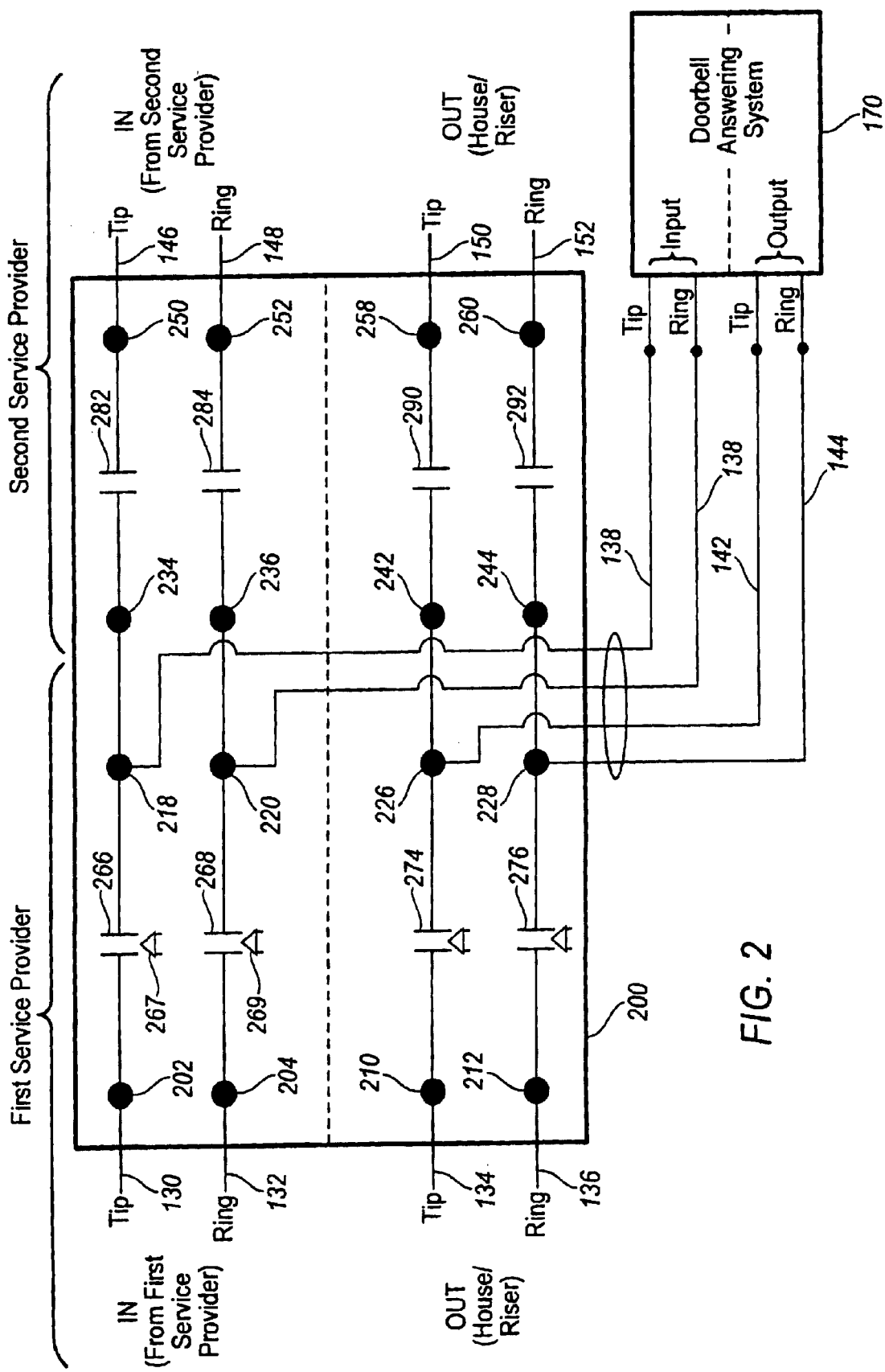
FIG. 2 is an electrical schematic diagram showing the manner in which customers may be connected to any of a plurality of service providers using the techniques and devices of the present invention.

In overview, an improved terminal block is provided for connecting a customer with any one of a plurality of telecommunications service providers, so as to permit the customer's service provider to be changed without inserting or removing wires from the terminal block. Refer to FIG. 2, which is an electrical schematic diagram showing the manner in which these customers may be connected to any of a plurality of service providers. Pursuant to a preferred embodiment of the invention, an improved terminal block 200 includes a first connection mechanism associated with a corresponding second connection mechanism. The first connection mechanism, when enabled, connects a customer to a first service provider, and the second connection mechanism, when enabled, connects the customer to a second service provider. An enabling mechanism is provided for enabling the first connection mechanism or the second connection mechanism.

In practice, terminal block 200 may provide a plurality of first connection mechanisms and a plurality of second connection mechanisms, but the example of FIG. 2 shows only one pair of first and second connection mechanisms for the sake of clarity. Each first connection mechanism includes a first normally-open contact 266 in series between a first terminal 202 and a second terminal 218, and a second normally-open contact 268 in series between a third terminal 204 and a fourth terminal 220. Each second connection mechanism includes a first normally-open contact 282 in series between a first terminal 234 and a second terminal 250, and a second normally-open contact 284 in series between a third terminal 236 and a fourth terminal 252. Each respective first connection mechanism is associated with a corresponding second connection mechanism such that the second terminal 218 of a respective first connection mechanism is electrically connected to the first terminal 218 of a corresponding second connection mechanism, and the fourth terminal 220 of a respective first connection mechanism is electrically connected to the third terminal 236 of a corresponding second connection mechanism. Each of respective pairs of first and third terminals 202, 204 of the first connection mechanisms are connected to corresponding incoming twisted-pair telephone lines 130, 132 from a first telecommunications service provider. Each of respective pairs of second and fourth terminals 250, 252 of the second connection mechanisms are connected to corresponding incoming twisted-pair telephone lines 146, 148 from a second telecommunications service provider. Each of respective pairs of second and fourth terminals 218, 220 of first connection mechanisms, and, consequently, each of respective pairs of first and third terminals 234, 236 of second connection mechanisms, are electrically connected to corresponding outgoing twisted-pair telephone lines 138, 140 routed to a customer premises. These telephone lines 138, 140 may be routed directly to the customer premises, or routed to the customer premises through optional ancillary equipment that may place switching devices in series or parallel with these telephone lines. The example of FIG. 2 uses ancillary equipment in the form of doorbell answering system 170, although the use of such ancillary equipment is optional.

In cases where it is desired to provide a customer with service from a first service provider, an enabling mechanism is used to enable the first connection mechanism. This enabling mechanism provides a first electrically conductive path across normally-open contact 266 and a second electrically conductive path across normally-open contact 268. Illustratively, the enabling mechanism may include one or more electrically conductive plugs 267, 269 which are insertable into one or more normally open contacts 266, 268. These plugs may optionally include an electrically-insulating handle portion so as to permit insertion into, and/or removal from, live electrical circuits. Taken together, normally-open contacts 266 and 268 provide a first connection mechanism. This first connection mechanism can be used to connect a customer with the first telecommunications service provider, as when plug 267 is inserted into contact 266 and plug 269 is inserted into contact 268.

On the other hand, assume that it is now desired to provide the customer with service from a second telecommunications service provider. If plug 267 is inserted into contact 282, and plug 269 is inserted into contact 284, these plugs enable a second connection mechanism that connects the customer with the second telecommunications service provider.

A still further embodiment of the invention is used in the operational environment of optional ancillary equipment, such as doorbell answering system 170. Each of a plurality of first and second connection mechanisms is associated with a corresponding set of third and fourth connection mechanisms. Each third connection mechanism includes a first normally-open contact 274 in series between a first terminal 210 and a second terminal 226, and a second normally-open contact 276 in series between a third terminal 212 and a fourth terminal 228. Each fourth connection mechanism also includes a first normally-open contact 290 in series between a first terminal 242 and a second terminal 258, and a second normally-open contact 292 in series between a third terminal 244 and a fourth terminal 260. Each respective third connection mechanism is associated with a corresponding fourth connection mechanism such that the second terminal 226 of a respective third connection mechanism is electrically connected to the first terminal 242 of a corresponding fourth connection mechanism, and the fourth terminal 228 of a respective third connection mechanism is electrically connected to the third terminal 244 of a corresponding fourth connection. mechanism.

Each of respective pairs of first and third terminals 210, 212 of third connection mechanisms are connected to corresponding outgoing twisted-pair telephone lines 134, 136 routed to a customer premises. Each of respective pairs of second and fourth terminals 258, 260 of fourth connection mechanisms are connected to corresponding outgoing twisted-pair telephone lines routed to a customer premises.

Typically, twisted-pair telephone lines 134, 136 and twisted-pair telephone lines 150, 152 of a given set of associated third and fourth connection mechanisms are routed to the same customer premises, and each line is "owned" by a corresponding service provider. This practice results in a situation where one of the two twisted pairs is always inactive at any given moment in time. However, from a technical standpoint, the same pair of wires 134, 136 could be used to carry signals from either service provider, even though this is not "conventional" practice at the present time. In such an alternate system, wire 134 would be connected to terminal 210 as well as terminal 258, and wire 136 would be connected to terminal 212 as well as terminal 260, eliminating the need for redundant wire pair 150–152. Such an alternate system is described herein inasmuch as future regulatory developments and changes to what is now considered common practice are difficult to predict with accuracy.

Each of respective pairs of second and fourth terminals 218, 220 of first connection mechanisms are connected to corresponding input terminals of optional ancillary equipment which, in the present example, is a doorbell answering system 170. Each of respective pairs of second and fourth terminals 226, 228 of third connection mechanisms are connected to corresponding output terminals of doorbell answering system 170. From a functional standpoint, doorbell answering system 170 includes switching devices to selectively couple wire 138 to wire 142, and to selectively couple wire 140 to wire 144. When wire 138 is not coupled to wire 142, and wire 140 is not coupled to wire 144, doorbell answering system 170 provides a local loop across wires 142 and 144 to the customer premises. This local loop enables communications between a customer and a person ringing the customer's doorbell.

An enabling mechanism enables the first connection mechanism and the associated third connection mechanism to provide access to the first service provider, or enables the second connection mechanism and the associated fourth connection mechanism to provide access to the second service provider. This enabling mechanism may be provided in the form of removable electrically conductive plugs which are insertable into any of the normally-open contacts such that, upon insertion, electrical continuity between the normally-open contacts is provided. In this manner, terminal block 200 is wired so as to permit any of a plurality of customers to be connected to any of a plurality of service providers without the necessity of removing and/or reconnecting wires from the terminal block 200.

The arrangement of contacts on terminal block 200 provides a configuration wherein diagnostics and troubleshooting may be readily performed. Due to the fact that the contacts are organized into a predetermined arrangement, only certain arrangements of conductive plugs in these contacts will provide a complete connection between a given service provider and a given set of telephone lines routed to a customer premises. Other arrangements of conductive plugs are erroneous, possibly resulting in a customer's line which is actually dedicated to a first service provider instead being connected to a second service provider. By viewing terminal block 200, it will be easy for service personnel to quickly identify any erroneous connections. If a first connection mechanism is enabled with a conductive plug, its associated third connection mechanism should also be enabled. If a second connection mechanism is enabled with a conductive plug, its associated fourth connection mechanism should also be enabled. Finally, the first connection mechanism and its associated second connection mechanism should not be enabled at the same time.

By adding additional contact sets to terminal block 200, it is possible to connect a customer to any of three, four, or more service providers. In the example of FIG. 2, a third service provider may be added by adding additional first, second, third, and fourth connection mechanisms to terminal block 200. The additional first connection mechanism would be connected to terminals 218, 220; the additional second connection mechanism to terminals 234, 236, the third connection mechanism to terminals 226, 228, and the fourth connection mechanism to terminals 242, 244. As is apparent to those skilled in the art, the foregoing principles can be applied to add any number of service providers to terminal block 200.

Whereas particular embodiments of the invention have been described herein for purposes of illustration, it will be appreciated by those skilled in the art that numerous variations in the details may be made without departing from the invention as described in the claims. For example, FIG. 2 sets forth enabling mechanisms in the form of normally-open contacts used in conjunction with conductive plugs. These normally-open contacts and conductive plugs are intended to illustrate the underlying functionality contemplated by the invention. Accordingly, the invention may, but need not, be implemented using such electromechanical contacts and mechanical plugs. It should be understood that, pursuant to an alternate embodiment of the invention, the enabling mechanisms may be implemented by programmable electronic switches or by computer-controlled switches. Such switches could be enabled, for example, by programming instructions, software, and/or firmware.

Although the invention has been described above in terms of enabling mechanisms, this is for illustrative purposes. For example, it is within the contemplation of the invention to use disabling mechanisms in place of enabling mechanisms, and/or to use a combination of disabling and enabling mechanisms. One example of a disabling mechanism would be a normally-closed electromechanical contact that may be disabled by placing an insulating plug between the normally-closed contacts.

We claim:

1. A terminal block for cormecting a customer with any of a plurality of telecommunications service providers, the block including:

a first connection mechanism which, when enabled, connects a customer to a first service provider;

a second connection mechanism which, when enabled, connects the customer to a second service provider, and an enabling mechanism for enabling either the first connection mechanism or the second connection mechanism; and wherein the first and second connection mechanisms each include normally-open contacts, and the enabling mechanism includes one or more electrically conductive plugs insertable into at least one of the normally-open contacts, so as to provide electrical conductivity across the normally open contacts of the first connection mechanism or the second connection mechanism or both the first and the second connection mechanisms.

2. A terminal block for connecting a customer with any of a plurality of telecommunications service providers, including:

a plurality of first connection mechanisms and a plurality of second connection mechanisms;

each first connection mechanism including a first normally-open contact in series between a first terminal and a second terminal, and a second normally-open contact in series between a third terminal and a fourth terminal;

each second connection mechanism including a first normally-open contact in series between a first terminal and a second terminal, and a second normally-open contact in series between a third terminal and a fourth terminal; and wherein an enabling mechanism is provided in the form of removable conductive plugs which are insertable into any of the normally-open contacts such that, upon insertion, electrical continuity between the normally-open contacts is provided.

3. The terminal block of claim 2 wherein each of respective first connection mechanisms is associated with a corresponding second connection mechanism such that the second terminal of a respective first connection mechanism is electrically connected to the first terminal of a corresponding second connection mechanism, and the fourth terminal of a respective first connection mechanism is electrically connected to the third terminal of a corresponding second connection mechanism.

4. The terminal block of claim 2 wherein each of respective pairs of first and third terminals of first connection mechanisms are connected to corresponding incoming twisted-pair telephone lines from a first telecommunications service provider, and each of respective pairs of second and fourth terminals of second connection mechanisms are connected to corresponding incoming twisted-pair telephone lines from a second telecommunications service provider.

5. The terminal block of claim 4 wherein each of respective pairs of second and fourth terminals of first connection mechanisms and/or each of respective pairs of first and third terminals of second connection mechanisms are electrically connected to corresponding outgoing twisted-pair telephone lines.

6. The terminal block of claim 5 wherein the outgoing twisted-pair telephone lines are routed to a customer premises.

7. The terminal block of claim 5 wherein the outgoing twisted-pair telephone lines are routed to a customer premises through ancillary equipment.

8. The terminal block of claim 7 wherein the ancillary equipment includes a switching mechanism for providing a local loop to the customer premises.

9. The terminal block of claim 5 wherein one or more removable conductive plugs are inserted into the first and second normally-open contacts so as to connect a customer with the first telecommunications service provider, or into the third and fourth normally-closed contacts so as to connect the customer with the second telecommunications service provider.

10. The terminal block of claim 4 wherein each of a plurality of first and second connection mechanisms is associated with a corresponding set of third and fourth connection mechanisms.

11. The terminal block of claim 10 wherein each third connection mechanism includes a first normally-open contact in series between a first terminal and a second terminal, and a second normally-open contact in series between a third terminal and a fourth terminal, and each fourth connection mechanism includes a first normally-open contact in series between a first terminal and a second terminal, and a second normally-open contact in series between a third terminal and a fourth terminal.

12. The terminal block of claim 11 wherein each respective third connection mechanism is associated with a corresponding fourth connection mechanism such that the second terminal of a respective third connection mechanism is electrically connected to the first terminal of a corresponding fourth connection mechanism, and the fourth terminal of a respective third connection mechanism is electrically connected to the third terminal of a corresponding fourth connection mechanism.

13. The terminal block of claim 12 wherein each of respective pairs of first and third terminals of third connection mechanisms are connected to corresponding outgoing twisted-pair telephone lines routed to a customer premises.

14. The terminal block of claim 12 wherein each of respective pairs of second and fourth terminals of fourth connection mechanisms are connected to corresponding outgoing twisted-pair telephone lines routed to a customer premises.

15. The terminal block of claim 13 wherein each of respective pairs of second and fourth terminals of first connection mechanisms are connected to corresponding input terminals of an ancillary switching device including a mechanism for providing local loops on the outgoing twisted-wire pair telephone lines.

16. The terminal block of claim 14 wherein each of respective pairs of second and fourth terminals of first connection mechanisms are connected to corresponding input terminals of an ancillary switching device including a mechanism for providing local loops on the outgoing twisted-wire pair telephone lines.

17. The terminal block of claim 15 wherein each of respective pairs of second and fourth terminals of third connection mechanisms are connected to corresponding output terminals of the ancillary switching device.

18. The terminal block of claim 16 wherein each of respective pairs of second and fourth terminals of third connection mechanisms are connected to corresponding output terminals of the ancillary switching device.

19. The terminal block of claim 12 wherein each of respective pairs of first and third terminals of third connection mechanisms are connected to corresponding outgoing twisted-pair telephone lines routed to a customer premises, and each of respective pairs of second and fourth terminals of fourth connection mechanisms are connected to corresponding outgoing twisted-pair telephone lines routed to a customer premises.

20. The terminal block of claim 19 wherein an enabling mechanism enables the first connection mechanism and the associated third connection mechanism to provide access to the first service provider, or enables the second connection mechanism and the associated fourth connection mechanism to provide access to the second service provider.

21. The terminal block of claim 20 wherein the enabling mechanism includes one or more removable conductive plugs which are insertable into any of the normally-open contacts such that, upon insertion, electrical continuity between the normally-closed contacts is provided.

22. A programmable switch for connecting a customer with any of a plurality of telecommunications service providers, the switch including:

a first connection mechanism which, when enabled, connects a customer to a first service provider, a second connection mechanism which, when enabled, connects the customer to a second service provider; and an enabling mechanism for enabling either the first connection mechanism or the second connection mechanism; and wherein the first and second connection mechanisms each include normally-open contacts, and the enabling mechanism includes one or more electrically conductive plugs insertable into at least one of the normally-open contacts, so as to provide electrical conductivity across the normally open contacts of the first connection mechanism or the second connection mechanism or both the first and the second connection mechanisms.

23. The programmable switch of claim 22 wherein the first and second connection mechanisms include electronic switches that are controlled by at least one of software, programming instructions, and firmware.

24. The terminal block according to claim 1, wherein each of the normally-open contacts comprises a first conductive surface spaced from a second conductive surface, wherein each of the conductive plugs fits in the space between the first conductive surface and the second conductive surface to provide electrical conductivity across the normally open contacts.

25. The terminal block according to claim 22, wherein each of the normally-open contacts comprises a first conductive surface spaced from a second conductive surface, wherein each of the conductive plugs fits in the space between the first conductive surface and the second conductive surface to provide electrical conductivity across the normally open contacts.

* * * * *